UNITED STATES PATENT OFFICE.

JOSEPH B. WILSON, OF PHILADELPHIA, ASSIGNOR TO HIMSELF, FISHER HAZARD, OF MAUCH CHUNK, AND SAMUEL B. HUEY, OF PHILADELPHIA, PA.

IMPROVEMENT IN FLUIDS FOR EXTRACTING GREASE FROM FABRICS.

Specification forming part of Letters Patent No. 122,094, dated December 19, 1871.

*To all whom it may concern:*

Be it known that I, JOSEPH B. WILSON, of Philadelphia, county of Philadelphia, State of Pennsylvania, have invented certain Improvements in Oil or Grease Extracting Fluids, of which the following is a specification:

My invention consists of an oil or grease extracting fluid, composed of the materials and in the manner too fully explained hereafter to need preliminary description, the said fluid being especially applicable to the extracting of the oil or grease from dirty cotton-waste, &c.

In carrying out my invention, I take about fifty pounds of caustic soda or caustic potash, or other equivalent alkali, and dissolve it in from one thousand to two thousand gallons of water, according to the desired strength of the fluid. After the alkali has been effectually dissolved in the water, I add to the solution another solution of about twenty-five pounds of chloride of lime in water. The two solutions having been mixed together, they are heated by steam or by a steam-coil, or otherwise, and, while the solution is hot, I add about twenty-five pounds of carbonate of ammonia, after which the greasy waste, oily rags, or other fibrous or textile materials impregnated with oily or greasy matter are thrown into the solution, while the latter is maintained at a temperature of about 212°. After agitating the waste or other material, the oil or grease will in a short time rise to the surface and be skimmed off and applied to various useful purposes. After the oil and grease have been thus removed from the waste, the fluid may be withdrawn and the waste removed and washed and dried in the ordinary manner, preparatory to being rinsed.

Of the three materials used in my oil-extracting fluid, the caustic soda or other equivalent alkali possesses the property of detaching oil, grease, &c., from the fibers; the chloride of lime, induces a settlement of the dirt from the said oil or grease to the bottom of the vessel; and the ammonia induces the oily or greasy matter to rise to the surface in a clear state, so that it may be skimmed off ready for use.

I claim as my invention—

An oil or grease extracting fluid, composed of the materials and in the manner and proportions substantially as described.

In testimony whereof I have signed my name to this specification in the presence of two subscribing witnesses.

JOS. B. WILSON.

Witnesses:
WM. A. STEEL,
JOHN K. RUPERTUS.

(98)